Figure 1:
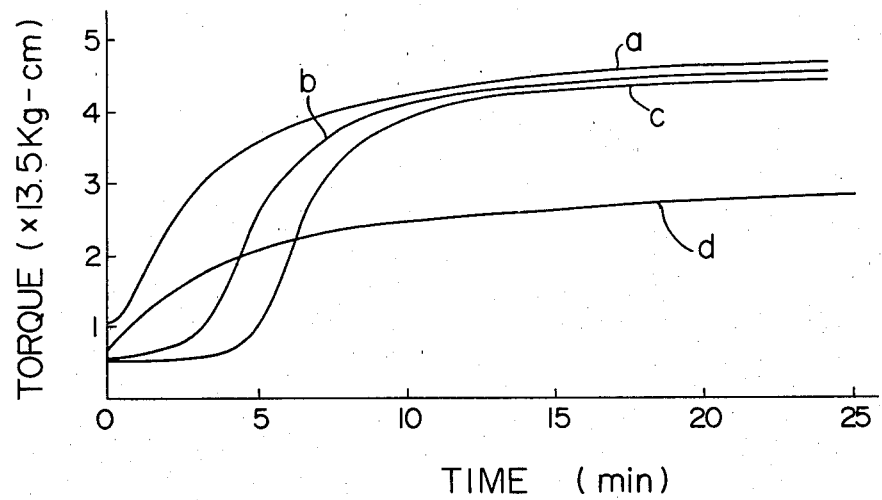

United States Patent [19]

Matoba

[11] 4,357,446
[45] Nov. 2, 1982

[54] CURABLE COMPOSITION OF HALOGEN-CONTAINING POLYMER

[75] Inventor: Yasuo Matoba, Toyonaka, Japan
[73] Assignee: Osaka Soda Co. Ltd., Osaka, Japan
[21] Appl. No.: 238,969
[22] Filed: Feb. 27, 1981

[30] Foreign Application Priority Data

Mar. 3, 1980 [JP] Japan .................................. 55-26901
Mar. 3, 1980 [JP] Japan .................................. 55-26902

[51] Int. Cl.³ ........................ C08F 8/34; C08C 19/22
[52] U.S. Cl. .................... 525/281; 525/326.3; 525/331.1; 525/331.5; 525/332.4; 525/331.8; 525/403; 525/348; 525/349; 528/421
[58] Field of Search ............... 525/281, 348, 349, 330, 525/329, 331, 332, 327, 333, 334, 335; 528/421

[56] References Cited

U.S. PATENT DOCUMENTS 3,091,613  5/1963  Sasse .................................. 544/349
4,174,341 11/1979  Matoba .............................. 525/348

OTHER PUBLICATIONS

Johnson, P. R., Rubber Journal, pp. 4-44, Apr. 1973.
Chem. Abst., 57, p. 13774(g).

Primary Examiner—C. A. Henderson
Attorney, Agent, or Firm—Sherman & Shalloway

[57] ABSTRACT

A curable composition of a halogen-containing polymer composed of (1) 100 parts by weight of a halogen-containing polymer,
(2) as a crosslinking agent, about 0.1 to about 10 parts by weight of a 2,3-dimercapto-pyrazine or -quinoxaline compound having the following formula

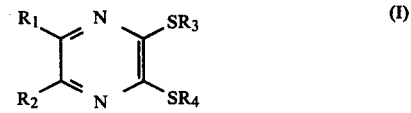

wherein $R_1$, $R_2$, $R_3$ and $R_4$ are identical or different and represent hydrogen or organic radicals, and
(3) as an acid acceptor, about 0.5 to about 50 parts by weight of a compound of a metal of Group II of IVa of the periodic table.

5 Claims, 2 Drawing Figures

CURABLE COMPOSITION OF HALOGEN-CONTAINING POLYMER

This invention relates to a curable composition of a halogen-containing polymer containing, as a crosslinking agent, a 2,3-dimercapto-pyrazine or 2,3-mercaptoquinoxaline compound which can readily and effectively induce curing of the halogen-containing polymer. Cured articles from the composition have various good properties such as a high vulcanization density, good heat-aging resistance and good dynamic fatigue resistance.

More specifically, this invention pertains to a curable composition of a halogen-containing polymer composed of (1) 100 parts by weight of a halogen-containing polymer, (2) as a crosslinking agent, about 0.1 to about 10 parts by weight of a 2,3-dimercapto-pyrazine or -quinoxaline compound having the following formula

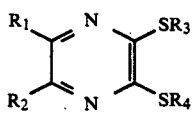

wherein $R_1$ and $R_2$ are identical or different and represent a hydrogen atom or a $C_1$–$C_8$ alkyl group, or $R_1$ and $R_2$ are bonded together to form a benzene ring which may be substituted by at least one substituent selected from the class consisting of halogen atoms, a nitro group, a carboxyl group, lower alkyl groups and lower alkoxy groups; and $R_3$ and $R_4$ are identical or different and represent a member selected from the class consisting of a hydrogen atom, alkali metals,

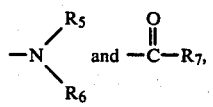

or $R_3$ and $R_4$ are bonded together to form $>C=O$, in which $R_5$ and $R_6$ are identical or different and represent a hydrogen atom or a $C_1$–$C_{12}$ group selected from the class consisting of alkyl groups, cycloalkyl groups, aryl groups and aralkyl groups, or $R_5$ and $R_6$ are bonded together with or without a hetero-atom other than the nitrogen atom to which they are bonded to form a 6-membered hetero-ring, and $R_7$ represents a $C_1$–$C_{18}$ group selected from the class consisting of alkyl groups, cycloalkyl groups, alkenyl groups, aryl groups and aralkyl groups, or $R_7$ represents

where n is 0 or 1 and when n is 1, $R_8$ represents a $C_1$–$C_8$ group selected from the class consisting of alkylene and alkenylene groups or a $C_6$–$C_{12}$ group selected from the class consisting of cycloalkylene and arylene groups, or $R_7$ represents

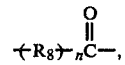

in which n and $R_8$ are the same as defined above and which is bonded to the thiol group of the 2,3-dimercaptopyrazine or -quinoxaline residual moiety through an ester linkage, the thiol group existing in the same molecule or another molecule of the residual moiety, and (3) as an acid acceptor, about 0.5 to about 50 parts by weight of a compound of a metal of Group II or IVa of the periodic table.

Halogen-containing polymers such as polychloroprene, polyepichlorohydrin, an epichlorohydrin/ethylene oxide copolymer, chlorine-containing acrylic rubber, chlorinated polyethylene, brominated butyl rubber, fluorine rubber and polyvinyl chloride in the cured state find extensive use as materials having good properties such as superior thermal stability, oil resistance and chemical resistance. It has been difficult however to cure the halogen-containing polymers effectively because the carbonhalogen bond in these polymers is chemically stable.

Numerous curing agents for halogen-containing polymers have been suggested heretofore, but none have shown a satisfactory curing effect. 2-Mercaptoimidazoline, a typical curing agent now in commercial use, too, has the defect that it cannot cure polymers having relatively low reactivity, such as chlorinated polyethylene or polyvinyl chloride, at a feasible speed. In addition, it has been pointed out that 2-mercaptoimidazoline may be carcinogenic (P. R. Johnson, Rubber Journal, pages 37–44, April 1973).

In view of the state of the art, it has been desired to develop other curing agents of industrial value which can easily and effectively cure halogen-containing polymers having relatively low reactivity.

It has now been found that the 2,3-dimercapto-pyrazine or -quinoxaline compounds represented by the above formula (I), which have not been known heretofore as any crosslinking agents, much less as crosslinking agents for the halogen-containing polymers exemplified above, are very useful as crosslinking agents capable of readily and effectively exerting a curing action on a wide range of halogen-containing polymers including those of relatively low reactivity as exemplified hereinabove.

The compounds of formula (I) and a process for their production are disclosed, for example, in U.S. Pat. No. 3,091,613 and Chem. Abst. 57 13774 g, and are known to be useful as pesticides such as insecticides and acaricides. Their utility as a crosslinking agent for polymers or rubbers including halogen-containing polymers has been completely unknown to date.

It has been found in accordance with this invention that 2,3-dimercapto-pyrazine or -quinoxaline compounds of formula (I), with or without a vulcanization accelerator, exhibit superior performance as a crosslinking agent for a wide variety of halogen-containing polymers.

It has also been found that cured products obtained by curing halogen-containing polymers with the compounds of formula (I) in the presence of the acid acceptor (3), with or without a vulcanization accelerator, have good properties, and the curing time changes little with a change in the amount of the crosslinking agent, thus insuring a good reproducibility of quality.

It is an object of this invention therefore to provide an improved curable composition of a halogen-containing polymer.

Another object of this invention is to provide a crosslinking agent useful for such a curable halogen-containing polymer composition.

The above and other objects and advantages of this invention will become more apparent from the following description.

The halogen-containing polymer in the curable composition of this invention includes a variety of polymers such as chlorinated polyethylene, a chlorinated ethylene-propylene copolymer, a chlorinated ethylene/propylene/nonconjugated diene terpolymer, chlorosulfonated polyethylene, polyvinyl chloride, chlorine-containing acrylic rubber, chlorinated butyl rubber, brominated butyl rubber, fluorine rubber, polychloroprene, polyepichlorohydrin, an epichlorohydrin/allyl glycidyl ether copolymer, an epichlorohydrin/ethylene oxide copolymer, and an epichlorohydrin/ethylene oxide/allyl glycidyl ether terpolymer.

The crosslinking agent used in this invention is a 2,3-dimercapto-pyrazine compound or a 2,3-dimercapto-quinoxaline compound represented by the following formula (I).

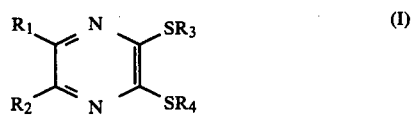
(I)

In formula (I), $R_1$ and $R_2$ are identical or different and represent a hydrogen atom or a $C_1$–$C_8$ alkyl group such as methyl, ethyl, n-propyl, iso-propyl, n-butyl, iso-butyl, tert.-butyl, n-pentyl, iso-pentyl, n-hexyl and n-heptyl.

Alternatively, $R_1$ and $R_2$ are bonded together to form a benzene ring which may be substituted by at least one substituent selected from the class consisting of halogen atoms, a nitro group, a carboxyl group, lower alkyl groups and lower alkoxy groups. In this case, the compounds of formula (I) can be expressed by the following formula (I-1).

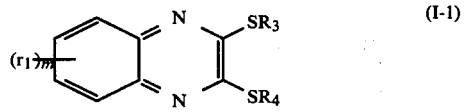
(I-1)

In formula (I-1), $R_3$ and $R_4$ are as defined with regard to formula (I), m represents zero or a positive integer of 1 to 4, $r_1$ represents a halogen atom, a nitro group, a carboxyl group, a lower alkyl group preferably having 1 to 4 carbon atoms or a lower alkoxy group preferably having 1 to 4 carbon atoms, and when m is two or more, two or more $r_1$ groups are identical or different.

In formula (I), $R_3$ and $R_4$ are identical or different and represent a member selected from the class consisting of hydrogen atom, alkali metals such as,

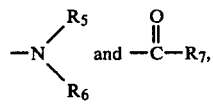

or $R_3$ and $R_4$ are bonded together to form $>C=O$. In

$R_5$ and $R_6$ are identical or different and represent a hydrogen atom or a $C_1$–$C_{12}$ group selected from the class consisting of alkyl groups, cycloalkyl groups, aryl groups and aralkyl groups.

The alkyl groups are preferably $C_1$–$C_8$ alkyl groups such as methyl, ethyl, t-butyl and octyl. The cycloalkyl groups include $C_6$–$C_{12}$ cycloalkyl groups, preferably $C_6$–$C_8$ cycloalkyl groups, such as cyclohexyl and 4-ethylcyclohexyl. The aryl groups include aryl groups having 6 to 12 carbon atoms, preferably $C_6$–$C_7$ aryl groups, such as phenyl and tolyl. Examples of the aralkyl groups are $C_7$–$C_{12}$ aralkyl groups, preferably $C_7$–$C_8$ aralkyl groups, such as benzyl and phenethyl.

Alternatively, $R_5$ and $R_6$ are bonded together with or without a hetero-atom other than the nitrogen atom to which they are bonded, to form a hetero-ring having six members.

Examples of the hetero-ring are piperidino, morpholino and piperazino.

In the group

$R_7$ represents a $C_1$–$C_{18}$ group selected from the class consisting of alkyl groups, cycloalkyl groups, alkenyl groups, aryl groups and aralkyl groups.

Examples of the alkyl groups are $C_1$–$C_{18}$ alkyl groups such as preferably $C_1$–$C_{17}$ alkyl groups such as methyl, isopropyl, 2-ethyl-pentyl and heptadecyl. Examples of the cycloalkyl groups include $C_6$–$C_{18}$ cycloalkyl groups, preferably $C_6$–$C_8$ cycloalkyl groups, such as cyclohexyl and 4-ethyl-cyclohexyl. Examples of alkenyl groups are $C_3$–$C_{18}$ alkenyl groups, preferably $C_6$–$C_{17}$ alkenyl groups, such as 2-hexenyl and heptadecenyl. The aryl groups include, for example, $C_6$–$C_{18}$ aryl groups, preferably $C_6$–$C_7$ aryl groups, such as phenyl and tolyl. Examples of the aralkyl groups are $C_7$–$C_{18}$ aralkyl groups, preferably $C_7$–$C_8$ aralkyl groups, such as benzyl and phenethyl.

Furthermore, in the group

$R_7$ may represent the group

where n is 0 or 1, and when n is 0, it represents —COOH. When n is 1 in the above formula, $R_8$ represents a $C_1$–$C_8$ group selected from the class consisting of alkylene and alkenylene groups or a $C_6$–$C_{12}$ group selected from the class consisting of cycloalkylene and arylene groups.

Examples of the alkylene groups are $C_2$–$C_8$ alkylene groups such as ethylene, tetramethylene, hexamethylene and octamethylene. Examples of the alkenylene groups are alkenylene groups having 4 to 8 carbon atoms, such as 2-butenylene, 3-hexenylene and 4-octenylene. Examples of the cycloalkylene groups are cycloalkylene groups having 6 or 7 carbon atoms such as 1,4-cyclohexylene and 2-methyl-1,4-cyclohexylene. Examples of the arylene are $C_6$ arylene groups such as o-phenylene, m-phenylene and p-phenylene.

In the group

$R_7$ may also represent the group

wherein n and $R_8$ are as defined above. In this case $R_7$ is bonded to the thiol group of the 2,3-dimercapto-pyrazine or -quinoxaline residual moiety through an ester-linkage, the thiol group existing in the same molecule or another molecule of the residual moiety. Examples of such compounds are compounds of the following formulae:

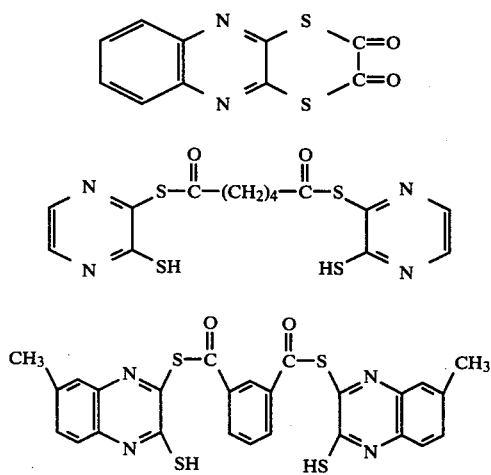

Furthermore, in formula (I), $R_3$ and $R_4$ may be bonded together to form the group $>C=O$, in which case the compounds of formula (I) are represented by the following formula (I-2).

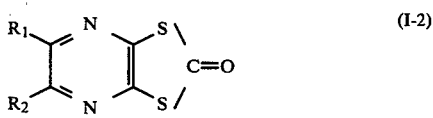

In formula (I-2), $R_1$ and $R_2$ are as defined with regard to formula (I).

In formula (I-2), $R_1$ and $R_2$ may be bonded together to form a benzene ring, in which case the compounds of formula (I) are represented by the following formula (I-3).

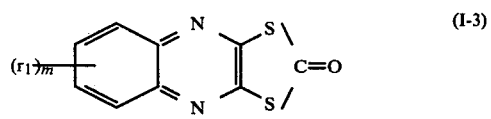

In formula (I-3), m and $r_1$ are as defined in formula (I-1).

Typical examples of the compounds of formula (I) include the following compounds.

2,3-Dimercaptopyrazine,
pyrazine-2,3-dithiocarbonate,
5-methyl-2,3-dimercaptopyrazine,
5-ethylpyrazine-2,3-dithiocarbonate,
5,6-dimethyl-2,3-dimercaptopyrazine,
5,6-dimethylpyrazine-2,3-dithiocarbonate,
N-methyl-3(2-mercaptopyrazyl)sulfenamide,
N,N'-dicyclohexyl-3(5-ethyl-2-mercaptopyrazyl)sulfenamide,
5-isopropyl-2-mercaptopyrazyl-3-thiol acetate,
5-methyl-2-mercaptopyrazyl-3-thiol benzoate,
5,6-dimethyl-2-mercaptopyrazyl-3-thiol sebacate,
2,3-dimercaptoquinoxaline,
quinoxaline-2,3-dithiocarbonate,
6-ethyl-2,3-dimercaptoquinoxaline,
6-methylquinoxaline-2,3-dithiocarbonate,
6,7-di(n-butyl)-2,3-dimercaptoquinoxaline,
N,N'-dicyclohexyl-3(2-mercaptoquinoxalyl)sulfenamide,
N-(n-butyl)-3-(6-methyl-2-mercaptoquinoxalyl)sulfenamide,
6-isopropyl-2-mercaptoquinoxalyl-3-thiol acetate,
5,8-dimethyl-2-mercaptoquinoxalyl-3-thiol benzoate,
6-isobutyl-2-mercaptoquinoxalyl-3-thiol sebacate,
6-Bromo-2,3-dimercaptoquinoxaline,
6-Methoxyquinoxaline-2,3-dithiocarbonate,
6-Nitro-2,3-dimercaptoquinoxaline, and
6-Carboxyquinoxaline-2,3-dithiocarbonate.

The curable composition of this invention further contains a compound of a metal of Group II or IVa of the periodic table as an acid acceptor. The metal compounds as an acid acceptor include oxides, hydroxides, carbonates, carboxylates, silicates, borates, and phosphites of metals of Group II of the periodic table, preferably Mg, Ba, Ca and Zn; and oxides, basic carbonates, basic carboxylates, basic phosphites, basic sulfites, and tribasic sulfates of metals of Group IVa of the periodic table, preferably Sn and Pb. Specific examples are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, basic lead phosphite, basic tin phosphite, basic lead sulfite, and tribasic lead sulfate.

The curable composition of this invention composed of 100 parts by weight of the halogen-containing polymer (1), about 0.1 to about 10 parts by weight, preferably about 0.3 to about 6 parts by weight, of 2,3-dimercapto-pyrazine or -quinoxaline compound of formula (I) as a crosslinking agent, and about 0.5 to about 50 parts by weight, preferably about 1 to about 30 parts by weight, more preferably about 1 to about 20 parts by weight, of the compound of a metal of Group II or IVa of the periodic table as an acid acceptor.

When the amount of the crosslinking agent (2) is too far below the specified limit, the crosslinking effect is insufficient, and when it far exceeds the upper limit specified, the resulting cured product is comparatively brittle. When the amount of the acid acceptor is too far below the specified limit, the resulting cured product has poor resistance to heat deterioration, and when it far exceeds the upper limit, the mechanical properties (such as tensile strength and elongation) of the resulting cured product are degraded.

In addition to the aforesaid three essential ingredients (1), (2) and (3), the curable composition of this invention may further include other additives conventionally used in the art.

Examples of such additives include organic or inorganic fillers such as calcium carbonate, clay, talc, diatomaceous earth, ferrite, mica powder, barium sulfate, graphite, glass fibers, cork powder and wood flour; reinforcing agents such as carbon black, silica, calcium silicate and basic magnesium carbonate; plasticizers such as dioctyl phthalate, diisodecyl adipate, chlorinated paraffin and process oils for rubbers; processing aids such as paraffin wax and stearic acid; antioxidants such as polymerized trimethyl dihydroquinoline, 2,6-di-tert-butyl-4-methyl-phenol and dilauryl thiodipropionate; coloring agents such as titanium oxide, red iron oxide and ultramarine; and fire retarding agents such as antimony trioxide, aluminum hydroxide, zinc borate, tris(chloroethyl)phosphate and tetrabromobisphenols.

The amounts of these additives per 100 parts by weight of the halogen-containing polymer are up to about 1000 parts by weight for the fillers; up to about 200 parts by weight for the reinforcing agents; up to about 100 parts by weight for the plasticizers; up to about 10 parts by weight for the processing aids; up to about 5 parts by weight for the antioxidants; up to about 50 parts by weight for the coloring agents; and up to about 50 parts by weight for the fire retardants.

The composition of this invention may further include a vulcanization accelerator, the use of which is preferred for halogen-containing polymers having a relatively low reactivity such as chlorinated polyethylene, polyvinyl chloride, chlorinated butyl rubber and polyepichlorohydrin. Examples of the vulcanization accelerator are elementary sulfur, thiuram sulfides, dithiocarbamates, sulfenamides, aliphatic or aromatic amines, salts of weak acids such as 2-mercaptobenzothiazole, phthalic acid or benzoic acid with these amines, addition products of these amines with alcohols or oximes, for examples adducts with cyclohexyl alcohol, or cyclohexanoneoxime, and basic silicas.

Specific examples of these vulcanization accelerators are dipentamethylenethiuram tetrasulfide, tetramethylthiuram disulfide, cadmium pentamethylenedithiocarbamate, tellurium dimethyldithiocarbamate, piperidine pentamethylenedithiocarbamate, cyclohexylamine, dibutylamine, dibutylammonium oleate, diphenyl guanidine, di-ortho-tolyl guanidine, acetaldehyde aniline, butyraldehyde aniline, N-cyclohexyl-2-benzothiazothiazyl sulfenamide, N,N'-dicyclohexyl-2-benzothiazyl sulfenamide, and a di-cyclohexylamine salt of 2-mercaptobenzothiazole.

The amount of the vulcanization accelerator is not particularly critical, but is preferably about 0.2 to about 6 parts by weight per 100 parts by weight of the halogen-containing polymer.

When the 2,3-dimercapto-pyrazine or -quinoxaline compound of formula (I) in the composition of this invention is an ester such as monothiolcarboxylic acid esters, dithioldicarboxylic acid esters, and pyrazine- or quinoxaline-2,3-dithiocarbonates, the addition of a vulcanization aid such as carboxylic acids, phenols, polyols or thiols is conducive to very rapid vulcanization rates. Examples of such vulcanization aids are lauric acid, benzoic acid, salicylic acid, gallic acid, catechol, pyrogallol, diethylene glycol, pentaerythritol, trimethylolpropane, trimethylolethane, sorbitol, bis-phenol A, mercaptobenzothiazole, and mercaptobenzimidazole. The amount of the vulcanization aid is, for example, about 0.1 to about 10 parts by weight, preferably about 0.3 to about 6 parts by weight, per 100 parts by weight of the halogen-containing polymer.

In order to impart excellent processing safety in addition to rapid vulcanization rates, there may be incorporated a vulcanization retarder of the following formula

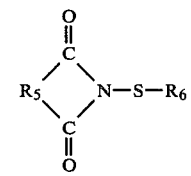

wherein $R_5$ and $R_6$, independently from each other, represent a $C_1$-$C_{20}$ aliphatic, alicyclic or aromatic hydrocarbon group.

Examples of the vulcanization retarder include N-cyclohexylthiophthalimide, N-cyclohexylthiosuccinimide, N-cyclohexylthiomaleimide, N-dodecylthiophthalimide, N-dodecylthiosuccinimide, N-dodecylthiomaleimide, N-phenylthiophthalimide, N-phenylthiosuccinimide, and N-phenylthiomaleimide. The amount of the vulcanization retarder is, for example, about 0.1 to about 5 parts by weight, preferably about 0.3 to about 2 parts by weight, per 100 parts by weight of the halogen-containing polymer.

The curable composition of this invention can be prepared by uniformly blending 100 parts by weight of the halogen-containing polymer (1), about 0.1 to about 10 parts by weight of the 2,3-dimercapto-pyragine or -quinoxaline compound as a crosslinking agent (2), about 0.5 to about 50 parts by weight of the metal compound as an acid acceptor (3), and optionally the other additives exemplified hereinabove. Blending can be effected by using known blending devices such as a mixing roll, a Banbury mixer, and various kneaders such as a pressure-type kneader. The blending temperature that can be employed is about 50° to about 100° C. for the curing agent and accelerator, and about 60° to about 200° C. for the other compounding agents.

The composition of this invention can be cured by heating it to a temperature of, say, about 100° to about 200° C. The heating time can be chosen properly, and may, for example, be about 0.5 to 120 minutes. Curing of the composition can be performed by any desired methods such as press-forming under heat in a mold, injection molding, and heat molding using a steam can, an air bath, an infrared ray, or microwaves.

The following examples illustrate the present invention more specifically. In these examples, the amounts of the various components are expressed in parts by weight unless otherwise specified.

EXAMPLES 1 TO 6 AND COMPARATIVE EXAMPLES 1 AND 2

In each run, the ingredients shown in Table 1 were kneaded on an open roll at 60° to 70° C. The resulting sheet was placed in a mold, and molded under pressure at 155° C. and 80 kg/cm² for 30 minutes. The vulcanizate obtained was tested for the various properties shown in Tables 2 to 5. The results are shown in Tables 2 to 5.

In Comparative Example 1, 2-mercaptoimidazoline customarily used as a vulcanizer for an epichlorohydrin/ethylene oxide copolymer was used, and in Comparative Example 2, 1-phenyl-3,5-dimercapto-1,2,4-triazole which is disclosed in U.S. Pat. No. 4,234,705 as a vulcanizer for a halogen-containing polymer was used.

Table 2 shows the basic properties of vulcanizates; Table 3 shows the heat-aging resistances of the vulcanizates obtained in Examples 1, 2, 3 and 6 and Comparative Examples 1 and 2 in terms of changes from their basic properties; Table 4 shows the results of tests for permanent compression set and oil resistance; and Table 5 shows the results of a dynamic fatigue test on the vulcanizates obtained in Examples 2 and 3 and Comparative Example 2.

The dynamic fatigue test was performed by the method of ASTM D623-58A using a Goodrich flexometer. A cylindrical specimen was subjected to repeated compression under a fixed load, and after a certain period of time, the test specimen was examined for change. The PS values (the decrease from the initial height of the test specimen) in Table 5 show the superiority of the vulcanizates in accordance with this invention.

The cure curves of the compounds obtained in Examples 1, 2 and 6 and Comparative Example 1 were determined by a JSR-type curelastometer at an angle of amplitude of 3° and a temperature of 155° C. The results are plotted in FIG. 1 in which curve a refers to Example 1; curve b, to Example 2; curve c, to Example 6 given hereinbelow; and curve d, to Comparative Example 1.

TABLE 1

| Example (Ex.) or Comparative Example (CEx.) | Ex. 1 | Ex. 2 | CEx. 1 | CEx. 2 | Ex. 3 | Ex. 4 | Ex. 5 | Ex. 6 |
|---|---|---|---|---|---|---|---|---|
| Polychloroprene (Neoprene W, *1) | 100 | | | | | | | |
| Epichlorohydrin-ethylene oxide copolymer (Epichlomer C, *2) | | 100 | 100 | 100 | | | | 100 |
| Epichlorohydrin homopolymer (Epichlomer H, *3) | | | | | 100 | | | |
| Brominated butyl rubber (Polysar Bromobutyl X-2, *4) | | | | | | 100 | | |
| Chlorinated butyl rubber (HT-1066, *5) | | | | | | | 100 | |
| SRF carbon black (Seast S, *6) | | | | | 20 | | | |
| FEF carbon black (Seast SO, *7) | 20 | 40 | 40 | 40 | | | 35 | 40 |
| HAF carbon black (Seast S, *8) | | | | | 20 | 50 | 35 | |
| Calcium carbonate (Hakuenka CC, *9) | 90 | | | | | | | |
| Dioctyltin distearate (lubricant) | 1 | 0.5 | 0.5 | 0.5 | 0.5 | 1 | | 0.5 |
| Trioctyl trimellitate (plasticizer) | 15 | | | | | | | |
| Nickel dibutyldithiocarbamate (antioxidant) | | 1 | 1 | 1 | 1 | | | 1 |
| Phenyl-β-naphthylamine (antioxidant) | 1 | | | | | | | |
| Magnesia | | 2 | 2 | 2 | | 10 | | 2 |
| Zinc oxide | 10 | | | | | | | |
| Calcium hydroxide | | 3 | 3 | 3 | 7 | | 5 | 3 |
| Barium carbonate | 4 | | | | | | | |
| 2-Mercaptobenzothiazole salt of dichlohexylamine | | | | | | 2 | | |
| Basic silica (Carplex #1120, *10) | | | | | | 5 | | |
| Diphenylguanidine | | | | | | | 1 | |
| Pentaerythritol | | 1 | | | | | | 1 |
| N—cyclohexylthioplthalimide | | | | | | | | 0.5 |
| 2,3-Dimercaptopyrazine | 0.8 | | | | | | | |
| 5-Ethylpyrazine-2,3-dithiocarbonate | | 1 | | | | | | 1 |
| 5,6-Dimethyl-2,3-dimercaptopyrazine | | | | | 2 | | | |
| N,N'—dicyclohexyl-3(5-ethyl-2-mercaptopyrazyl)sulfenamide | | | | | | 3 | 3 | |
| 5-isopropyl-2-mercaptopyrazyl-3-thiolacetate | | | | | | | 4 | |
| 2-Mercaptoimidazoline | | | 1 | | | | | |
| 1-Phenyl-3,5-dimercapto-1,2,4-triazole | | | | 1 | | | | |

Note to TABLE 1
(*1): a tradename for a product of E.I. du Pont de Nemours & Co.
(*2): a tradename for a product of Osaka Soda Co., Ltd.
(*3): a tradename for a product of Osaka Soda Co., Ltd.
(*4): a tradename for a product of Polysar Co.
(*5): a tradename for a product of Shell Chemical Co.
(*6): a tradename for a product of Tokai Carbon Co., Ltd.
(*7): a tradename for a product of Tokai Carbon Co., Ltd.
(*8): a tradename for a product of Tokai Carbon Co., Ltd.
(*9): a tradename for a product of Shiraishi Kogyo K.K.
(*10): a tradename for a product of Shionogi Pharmaceutical Co., Ltd.

TABLE 2

| Example (Ex.) or Comparative Example (CEx.) | Ex. 1 | Ex. 2 | CEx. 1 | CEx. 2 | Ex. 3 | Ex. 4 | Ex. 5 | Ex. 6 |
|---|---|---|---|---|---|---|---|---|
| | Basic Properties | | | | | | | |
| 100% Modulus (kg/cm²) | 37 | 41 | 26 | 30 | 44 | 30 | 25 | 40 |
| 300% Modulus (kg/cm²) | 80 | 105 | 68 | 96 | 102 | 110 | 89 | 102 |

TABLE 2-continued

Basic Properties

| Example (Ex.) or Comparative Example (CEx.) | Ex. 1 | Ex. 2 | CEx. 1 | CEx. 2 | Ex. 3 | Ex. 4 | Ex. 5 | Ex. 6 |
|---|---|---|---|---|---|---|---|---|
| Tensile strength (kg/cm$^2$) | 163 | 151 | 125 | 135 | 160 | 175 | 130 | 146 |
| Elongation at break (%) | 470 | 420 | 830 | 500 | 370 | 435 | 460 | 440 |
| Hardness (JISA) | 69 | 73 | 63 | 68 | 75 | 59 | 63 | 71 |

TABLE 3

Heat-aging resistance (in a Greer's oven)

| Example (Ex.) or Comparative Example (CEx.) | Ex. 1 | Ex. 2 | CEx. 1 | CEx. 2 | Ex. 3 | Ex. 6 |
|---|---|---|---|---|---|---|
| (3 days at 135° C.) | | | | | | |
| Change in tensile strength (%) | −28.5 | +5.0 | +4.0 | — | +2.0 | — |
| Change in elongation at break (%) | −87.0 | −14.0 | −38.0 | — | 0 | — |
| Change in hardness (point) | +25 | +4 | +4 | — | 0 | — |
| (2 days at 150° C.) | | | | | | |
| Change in tensile strength (%) | — | −23.0 | Unmeasurable because the sample was softened | −47.0 | — | −27.4 |
| Change in elongation at break (%) | — | −56.6 | | −60.5 | — | −53.5 |
| Change in hardness (point) | — | +2 | | +1 | — | 0 |
| (20 days at 150° C.) | | | | | | |
| Change in tensile strength (%) | — | −61.0 | Unmeasurable because the sample was softened | — | −33.5 | −66.5 |
| Change in elongation at break (%) | — | −68.5 | | — | −53.0 | −60.0 |
| Change in handness (point) | — | −4 | | — | 0 | −6 |

TABLE 4

Permanent compression set and oil resistance

| Example (Ex.) or Comparative Example (CEx.) | Ex. 1 | Ex. 2 | CEx. 1 | CEx. 2 | Ex. 3 | Ex. 4 | Ex. 5 | Ex. 6 |
|---|---|---|---|---|---|---|---|---|
| Permanent compression set (25% compression) | | | | | | | | |
| 100° C. × 70 hours (%) | 38 | — | — | — | — | — | 48 | — |
| 120° C. × 70 hours (%) | — | 37 | 71 | 37 | 35 | 30 | — | 39 |
| Oil resistance (JIS No. 3 oil, 120° C. × 70 hours) | | | | | | | | |
| Degree of volume expansion (%) | 60.1 | 11.2 | 17.4 | 12.4 | 12 | — | — | — |

TABLE 5

Dynamic fatigue resistance

| | Example 2 | Comparative Example 2 | Example 3 |
|---|---|---|---|
| ΔT (°C.) | 13 | 24 | 14 |
| ISC (%) | 12.5 | 15.7 | 12.7 |
| IDC (%) | 4.0 | 7.5 | 6.0 |
| PS (%) | 0.7 | 2.4 | 1.1 |

Measured by the method of ASTM D623-58A (by means of a Goodrich flexometer) under the following conditions.

Stroke: 0.175 inch
Load: 25 pounds
Vibration: 1800 cycles/min.
Testing temperature: 100° C.
Testing time: 25 minutes The abbreviations used in Table 5 have the following meanings.

ΔT: heat-generating temperature
ISC: initial static compression
IDC: initial dynamic compression
PS: permanent set

EXAMPLES 7 TO 12 AND COMPARATIVE EXAMPLES 3 AND 4

In each run, the ingredients shown in Table 6 was kneaded on an open roll at 60° to 70° C. The resulting sheet was vulcanized as described in Examples 1 to 6 and the vulcanizate obtained was tested for the various properties as in Examples 1 to 6. The results are shown in Tables 7 to 10.

In Comparative Example 3, 2-mercaptoimidazoline was used, and in Comparative Example 4, 4-allyl-3,5-dimercapto-1,2,4-triazole disclosed in U.S. Pat. No. 4,234,705 was used.

Table 7 shows the basic properties of the vulcanizates. Table 8 shows the heat-aging resistances of the vulcanizates obtained in Examples 7, 8, 9 and 12 and Comparative Examples 3 and 4 in terms of changes from the basic properties. Table 9 shows the results of a test for permanent compression set conducted on the vulcanizates.

Table 10 shows the results of the dynamic fatigue test of the vulcanizates obtained in Examples 8, 9 and Comparative Example 4. The method for testing the dynamic fatigue was the same as that described above with regard to Table 5.

It is seen from the PS values shown in Table 10 that the vulcanizates in accordance with this invention have superior dynamic fatigue resistance.

Figure 2:
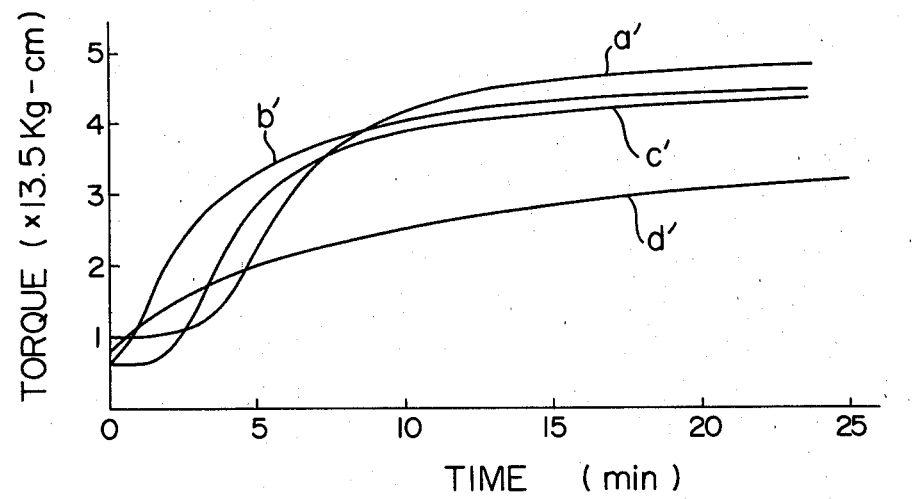

The cure curves of the compounds obtained in Examples 7, 8, 12 and Comparative Example 3 were determined by a JSR-type curelastometer at an angle of amplitude of 3° and a temperature of 155° C. The results are plotted in FIG. 2 in which curve a' refers to Example 7, curve b', to Example 8, curve c', to Example 12, and curve d', to Comparative Example 3.

TABLE 6

| Examples (Ex.) or Comparative Example (CEx.) | Ex. 7 | Ex. 8 | CEX. 3 | CEx. 4 | Ex. 9 | Ex. 10 | Ex. 11 | Ex. 12 |
| --- | --- | --- | --- | --- | --- | --- | --- | --- |
| Polychlorprene (Neoprene W, *1) | 100 | | | | | | | |
| Epichlorohydrin-ethylene oxide copolymer (Epichlomer C, *2) | | 100 | 100 | 100 | | | | 100 |
| Epichlorohydrin homopolymer (Epichlomer H, *3) | | | | | 100 | | | |
| Brominated butyl rubber (Polysar Bromobutyl X-2, *4) | | | | | | 100 | | |
| Chlorinated butyl rubber (HT-1066, *5) | | | | | | | 100 | |
| SRF carbon black (Seast S, *6) | | | | | 20 | | | |
| FEF carbon black (Seast SO, *7) | 20 | 40 | 40 | 40 | | | 35 | 40 |
| HAF carbon black (Seast S, *8) | | | | | 20 | 50 | 35 | |
| Calcium carbonate (Hakuenka CC, *9) | 90 | | | | | | | |
| Dioctyltin distearate (lubricant) | 1 | 0.5 | 0.5 | 0.5 | 0.5 | 1 | | 0.5 |
| Trioctyl trimellitate (plasticizer) | 15 | | | | | | | |
| Nickel dibutyldithiocarbamate (antioxidant) | | 1 | 1 | 1 | 1 | | | 1 |
| Phenyl-$\beta$-naphthylamine (antioxidant) | 1 | | | | | | | |
| Magnesia | | | | | 5 | | | |
| Zinc oxide | 5 | | | | | | | |
| Calcium hydroxide | 3 | 2 | 2 | 2 | | | 5 | 2 |
| Barium carbonate | | 10 | 10 | 10 | | 10 | | 10 |
| Butyraldehyde aniline (Nocseller 8, *10) | | | | | 0.5 | | | |
| Cyclohexylamine | | | | | | | 1 | |
| Salicylic acid | 0.5 | | | | | | | |
| N—cyclohexylthiophthalimide | | | | | | | | 1 |
| 6-Methylquinoxaline-2,3-dithiocarbonate | 1.5 | | | | | | | |
| 2,3-Dimercaptoquinoxaline | | 1 | | | | | | 1 |
| 6-Ethyl-2,3-dimercaptoquinoxaline | | | | | 2 | | | |
| N—(n-butyl)-3(6-methyl-2-mercaptoquinoxalyl)sulfenamide | | | | | | 4 | | |
| 6-isobutyl-2-mercaptoquinoxalyl-3-thiolsebacate | | | | | | | 6 | |
| 2-Mercaptoimidazoline | | | 1 | | | | | |
| 4-Allyl-3,5-dimercapto-1,2,4-triazole | | | | 1 | | | | |

(*1) to (*9): Same as the note to Table 1,
(*10): a tradename for a product of Ouchi Shinko Kogyo K.K.

TABLE 7

| | Basic properties | | | | | | | |
| --- | --- | --- | --- | --- | --- | --- | --- | --- |
| Example (Ex.) or Comparative Example (CEx.) | Ex. 7 | Ex. 8 | CEx. 3 | CEx. 4 | Ex. 9 | Ex. 10 | Ex. 11 | Ex. 12 |
| 100% Modulus (kg/cm$^2$) | 31 | 35 | 23 | 30 | 37 | 34 | 24 | 33 |
| 300% Modulus (kg/cm$^2$) | 77 | 100 | 62 | 94 | 105 | 117 | 88 | 97 |
| Tensile strength (kg/cm$^2$) | 143 | 145 | 117 | 180 | 155 | 181 | 130 | 140 |
| Elongation at break (%) | 530 | 470 | 880 | 510 | 440 | 410 | 475 | 490 |
| Hardness (JISA) | 64 | 68 | 61 | 67 | 70 | 60 | 63 | 66 |

TABLE 8

| | Heat-aging resistance (in a Geer's oven) | | | | | |
| --- | --- | --- | --- | --- | --- | --- |
| Example (Ex.) or Comparative Example (CEx.) | Ex. 7 | Ex. 8 | CEx. 3 | CEx. 4 | CEx. 9 | CEx. 12 |
| (3 days at 135° C.) | | | | | | |
| Change in tensile strength (%) | −15.0 | +12.0 | +9.0 | — | 0 | — |
| Change in elongation at break (%) | −80.0 | −5.0 | −41.0 | — | −4.0 | — |
| Change in hardness (point) | +26 | +3 | +3 | — | +1 | — |
| (12 days at 150° C.) | | | | | | |
| Change in tensile strength (%) | — | −17.5 | Unmeasurable because the | −45.5 | — | −24.0 |

TABLE 8-continued

Heat-aging resistance (in a Geer's oven)

| Example (Ex.) or Comparative Example (CEx.) | Ex. 7 | Ex. 8 | CEx. 3 | CEx. 4 | CEx. 9 | CEx. 12 |
|---|---|---|---|---|---|---|
| Change in elongation at break (%) | — | −61.0 | sample was softened | −60.0 | — | −67.0 |
| Change in hardness (point) | — | +4 | | +1 | — | +1 |
| (20 days at 150° C.) Change in tensile strength (%) | — | −57.0 | Unmeasurable because the sample was softened | — | −29.5 | −56.5 |
| Change in elongation at break (%) | — | −70.0 | | — | −58.0 | −75.0 |
| Change in hardness (point) | — | −5 | | — | −1 | −8 |

TABLE 9

Permanent compression set

| Example (Ex.) or Comparative Example (CEx.) | Ex. 7 | Ex. 8 | CEx. 3 | CEx. 4 | Ex. 9 | Ex. 10 | Ex. 11 | Ex. 12 |
|---|---|---|---|---|---|---|---|---|
| Permanent compression set (25% compression) | | | | | | | | |
| 100° C. × 70 hours (%) | 41 | — | — | — | — | — | 45 | — |
| 120° C. × 70 hours (%) | — | 35 | 76 | 38 | 38 | 26 | — | 38 |

TABLE 10

Dynamic fatigue resistance

| | Example 8 | Comparative Example 4 | Example 9 |
|---|---|---|---|
| Δ T (°C.) | 13 | 25 | 13 |
| ISC (%) | 12.5 | 15.5 | 12.9 |
| IDC (%) | 4.1 | 7.6 | 6.1 |
| PS (%) | 0.9 | 2.8 | 1.3 |

EXAMPLES 13 to 16

In each run, the ingredients shown in Table 11 were kneaded and tested as described in Examples 7 to 12. The results are shown in Table 12.

TABLE 11

(Recipe: parts)

| Example | 13 | 14 | 15 | 16 |
|---|---|---|---|---|
| Epichlorohydrin-ethylene oxide copolymer (Epichlomer C) | 100 | 100 | 100 | 100 |
| FEF carbon black (Seast SO) | 40 | 40 | 40 | 40 |
| Dioctyltin distearate (lubricant) | 0.5 | 0.5 | 0.5 | 0.5 |
| Nickel dibutyldithiocarbamate (antioxidant) | 1 | 1 | 1 | 1 |
| Magnesia | | | 5 | |
| Calcium hydroxide | | 10 | | 5 |
| Barium carbonate | 10 | | | |
| Salicyclic acid | | 0.7 | | 0.7 |
| N—cyclohexylthiophthalimide | 0.5 | | 0.5 | |
| 6-Bromo-2,3-dimercaptoquinoxaline | 3 | | | |
| 6-Methoxyquinoxaline-2,3-dithiocarbonate | | 2 | | |
| 6-Nitro-2,3-dimercaptoquinoxaline | | | 2 | |
| 6-Carboxyquinoxaline-2,3-dithiocarbonate | | | | 2 |

TABLE 12

| | Example | 13 | 14 | 15 | 16 |
|---|---|---|---|---|---|
| Basic properties | 100% Modulus (kg/cm²) | 41 | 38 | 35 | 36 |
| | 300% Modulus (kg/cm²) | 110 | 105 | 100 | 100 |
| | Tensile strength (kg/cm²) | 145 | 144 | 144 | 147 |
| | Elongation at break (%) | 410 | 440 | 450 | 455 |
| | Hardness (JISA) | 70 | 69 | 68 | 69 |
| Heat-aging resistance (20 days at 150° C.) | Change in tensile strength (%) | −51.0 | −61.0 | −47.5 | −49.0 |
| | Change in elongation at break (%) | −64.0 | −75.0 | −55.5 | −57.0 |
| | Change in hardness (point) | −2 | −6 | −2 | −3 |
| Permanent compression set | (25% compression) 120° C. × 70 hours (%) | 28 | 39 | 40 | 37 |

What we claim is:
1. A curable composition of a halogen-containing polymer composed of
(1) 100 parts by weight of a halogen-containing polymer selected from the group consisting of chlorinated polyethylene, a chlorinated ethylene/propylene copolymer, a chlorinated ethylene/propylene/non-conjugated diene terpolymer, chlorosulfonated polyethylene, polyvinyl chloride, chlorine-containing acrylic rubbers, chlorinated butyl rubber, brominated butyl rubber, fluorine rubber, polychloroprene, polyepichlorohydrin, an epichlorohydrin/allyl glycidyl ether copolymer, an epichlorohydrin/ethylene oxide copolymer, and an epichlorohydrin/ethylene oxide/allyl glycidyl ether terpolymer,
(2) as a crosslinking agent, about 0.1 to about 10 parts by weight of a 2,3-dimercapto-pyrazine or -quinoxaline compound having the following formula

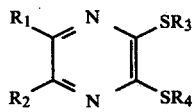

(I)

wherein $R_1$ and $R_2$ are identical or different and represent a hydrogen atom or a $C_1$–$C_8$ alkyl group, or $R_1$ and $R_2$ are bonded together to form a benzene ring which may be substituted by at least one substituent selected from the class consisting of halogen atoms, a nitro group, a carboxyl group, lower alkyl groups and lower alkoxy groups; and $R_3$ and $R_4$ are identical or different and represent a member selected from the class consisting of a hydrogen atom,

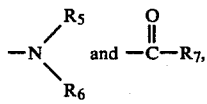

or $R_3$ and $R_4$ are bonded together to form $>C=O$, in which $R_5$ and $R_6$ are identical or different and represent a hydrogen atom or a $C_1$–$C_{12}$ group selected from the class consisting of alkyl groups and cycloalkyl groups and $R_7$ represents a $C_1$–$C_{18}$ group selected from the class consisting of alkyl groups and aryl groups or $R_7$ represents

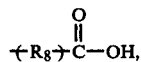

wherein $R_8$ represents a $C_1$–$C_8$ group alkylene group, and (3) as an acid acceptor, about 0.5 to about 50 parts by weight of a compound of a metal of Group II or IVa of the periodic table.

2. A cured composition obtained by curing the curable composition of claim 1.

3. The composition of claim 1 wherein the metal of Groups II or IVa is a metal selected from the group consisting of Mg, Ba, Ca, Zn, Sn and Pb.

4. The composition of claim 1 which further comprises about 0.2 to about 6 parts by weight, per 100 parts by weight of the halogen-containing polymer, of a vulcanization accelerator.

5. The composition of claim 1 wherein said crosslinking agent (2) is selected from the group consisting of 2,3-Dimercaptopyrazine, pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, 5,6-dimethylpryazine-2,3-dithiocarbonate, N-methyl-3 (2-mercaptopyrazyl)sulfenamide, N,N'-dicyclohexyl-3 (5-ethyl-2-mercaptopyrazyl)-sulfenamide, 5-isopropyl-2-mercaptopyrazyl-3-thiol acetate, 5-methyl-2-mercaptopyrazyl-3 thiol benzoate, 5,6-dimethyl-2-mercaptopyrazyl-3-thiol sebacate, 2,3-dimercaptoquinoxaline, quinoxaline-2,3-dithiocarbonate, 6-ethyl-2,3-dimercaptoquinoxaline, 6-methylquinoxaline-2,3-dithiocarbonate,6,7-di(n-butyl)-2,3-dimercaptoquinoxaline, N,N'-dicyclohexyl-3(2-mercaptoquinoxalyl)sulfenamide, N-(n-butyl)-3-(6-methyl-2-mercaptoquinoxalyl)-sulfenamide, 6-isopropyl-2-mercaptoquinoxalyl-3-thiol acetate, 5,8-demethyl-2-mercaptoquinoxalyl-3-thiol benzoate, 6-isobutyl-2-mercaptoquinoxalyl-3-thiol sebacate, 6-Bromo-2,3-dimercaptoquinoxaline, 6-Methoxyquinoxaline-2,3-dithiocarbonate, 6-Nitro-2,3-dimercaptoquinoxaline, and 6-Carboxyquinoxaline-2,3-dithiocarbonate.

* * * * *